Feb. 11, 1958 A. R. ZIPF 2,823,261

CODE COMMUNICATION SYSTEM

Filed May 7, 1956 4 Sheets-Sheet 1

INVENTOR.
ALFRED R. ZIPF
BY Lyon & Lyon
ATTORNEYS

Feb. 11, 1958 A. R. ZIPF 2,823,261

CODE COMMUNICATION SYSTEM

Filed May 7, 1956 4 Sheets-Sheet 2

INVENTOR.
ALFRED R. ZIPF
BY Lyon & Lyon
ATTORNEYS

Feb. 11, 1958 A. R. ZIPF 2,823,261

CODE COMMUNICATION SYSTEM

Filed May 7, 1956 4 Sheets-Sheet 3

INVENTOR.
ALFRED R. ZIPF
BY Lyon & Lyon
ATTORNEYS

INVENTOR.
ALFRED R. ZIPF
BY Lyon & Lyon
ATTORNEYS 2,823,261

CODE COMMUNICATION SYSTEM

Alfred R. Zipf, San Carlos, Calif., assignor to Bank of America National Trust and Savings Association, San Francisco, Calif., a national banking association Application May 7, 1956, Serial No. 583,145

6 Claims. (Cl. 179—3)

This invention relates to code-transmission systems and, more particularly, to an improved system for transmitting code signals over telephone facilities.

In the conduct of present-day business of the type having a number of branches which are widely separated, it oftentimes becomes necessary to transmit between these branches masses of information or data. If this is a continual need, then usually telegraph or telephone lines are leased, known as private lines, whereby direct connection for the purpose of transmitting such data between the branches of the business is made possible. Teletype and/or facsimile transmission is often used with these systems. A need exists for a reliable and inexpensive system providing a mass transmission of data accurately, rapidly, and economically, for those businesses where the occurrence of such needs does not arise sufficiently frequently to warrant the expense of permanently leasing a direct wire. Oftentimes the mass transmission of data rapidly and accurately becomes necessary between two distant localities where the sole available communication facilities therebetween is a toll-telephone line. An arrangement for employing a telephone system as the transmission medium for code signals in the form of tone signals is described and shown in the patents to D'Humy et al., Nos. 2,186,899 and 2,186,895. The present invention broadly also contemplates the transmission of data over the telephone in the form of tone signals. However, the present invention is an improvement over those described.

It is an object of the present invention to provide an improved data-transmission system employing telephone facilities as the carrier for the data being transmitted.

It is a further object of the present invention to provide an improved data-transmission system employing telephone facilities as the transmission medium, which affords rapid and accurate data transmission.

It is still another object of the present invention to provide a novel, improved, and relatively inexpensive code transmitter and receiver suitable for employing with the commonly known telephone communication facilities.

These and other objects of the invention are achieved in a system wherein the transmitter generates a sequence of tone signals corresponding to a start signal for each character of data, the code representative of the character of data which is to be transmitted, and a parity signal. These tone signals are applied to the regular telephone line via the regular telephone transmitter. The code receiver generates a monitor tone which is sent back to the transmitter. As long as this monitor tone is received, the transmitter will transmit the data in the form of the coded tone signals. Any interruption in the tone or variations thereof causes the transmitter to cease transmission. The receiver does not commence to operate until it receives the "start" signal. It then cuts off the monitor tone signal until it has had an opportunity to store the code character and check the parity. After the code character has been stored and if the parity check is in order, the monitor tone is transmitted to the transmitter again requesting it to transmit the next data character.

More specifically, the recorded data for the transmitter is in the form of punched paper tape. This punched paper tape has a five-hole code, as well as timing holes. Each data character or number is thus recorded as the presence or absence of holes in five adjacent places corresponding to a five-binary-digit character. The transmitter generates tone signals of 2000 cycles for the presence of a hole in the paper tape and 1400 cycles in the absence of a hole in the paper tape. A start signal derived from the timing hole is first sent out and then it is followed by a sequence of tone signals representing the five-binary-digit code. The transmitter also generates a sixth binary digit, which is representative of the parity digit. The receiver generates and sends a 600-cycle monitor tone to the receiver each time the next character of data is desired.

The code receiver includes apparatus for detecting the tone signals from the regular telephone receiver. The receiver checks each transmission for proper parity to determine if the code character received is correct. If it is not, the 600-cycle monitor signal is prevented from being transmitted, thereby stopping further transmitter operation. If parity is correct, the receiver enables the perforation of a paper tape with the code being received. Thus, a two-way check of the facility carrying the code signals is provided.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

As previously described, the present embodiment of the invention is one in which data characters in the form of tone signals derived from information in the form of five-binary-digit characters punched on paper tape are transmitted over the facilities provided by the telephone system. The preparation of such punched paper tape to represent the data desired to be transmitted is well known, and apparatus for this purpose may be purchased commercially. Therefore, no further description of this process is deemed necessary here. Also well known and commercially purchasable are the so-called readers of the code punched in the paper tape. These may comprise photoelectric cells or feeler switches, which are merely pins which close a circuit through the paper tape wherever a hole is present and are prevented from closing a circuit wherever a hole is not present. The paper tape, in addition to having aligned perforations representing a five-binary-digit character also has a sixth hole aligned with every character which is used for timing purposes. This sixth hole provides the start signal in the embodiment of the present invention to be described.

The embodiment of the invention to be described is employed with the usual telephone, namely, a telephone receiver and transmitter at both the transmitting and receiving stations. A microphone (not shown) is applied to the telephone receiver at both sending and receiving stations to convert acoustic tone signals to electrical signals. A small loudspeaker (not shown) is applied to the telephone transmitters to convert electrical tone signals to acoustic tone signals.

Figure 1:
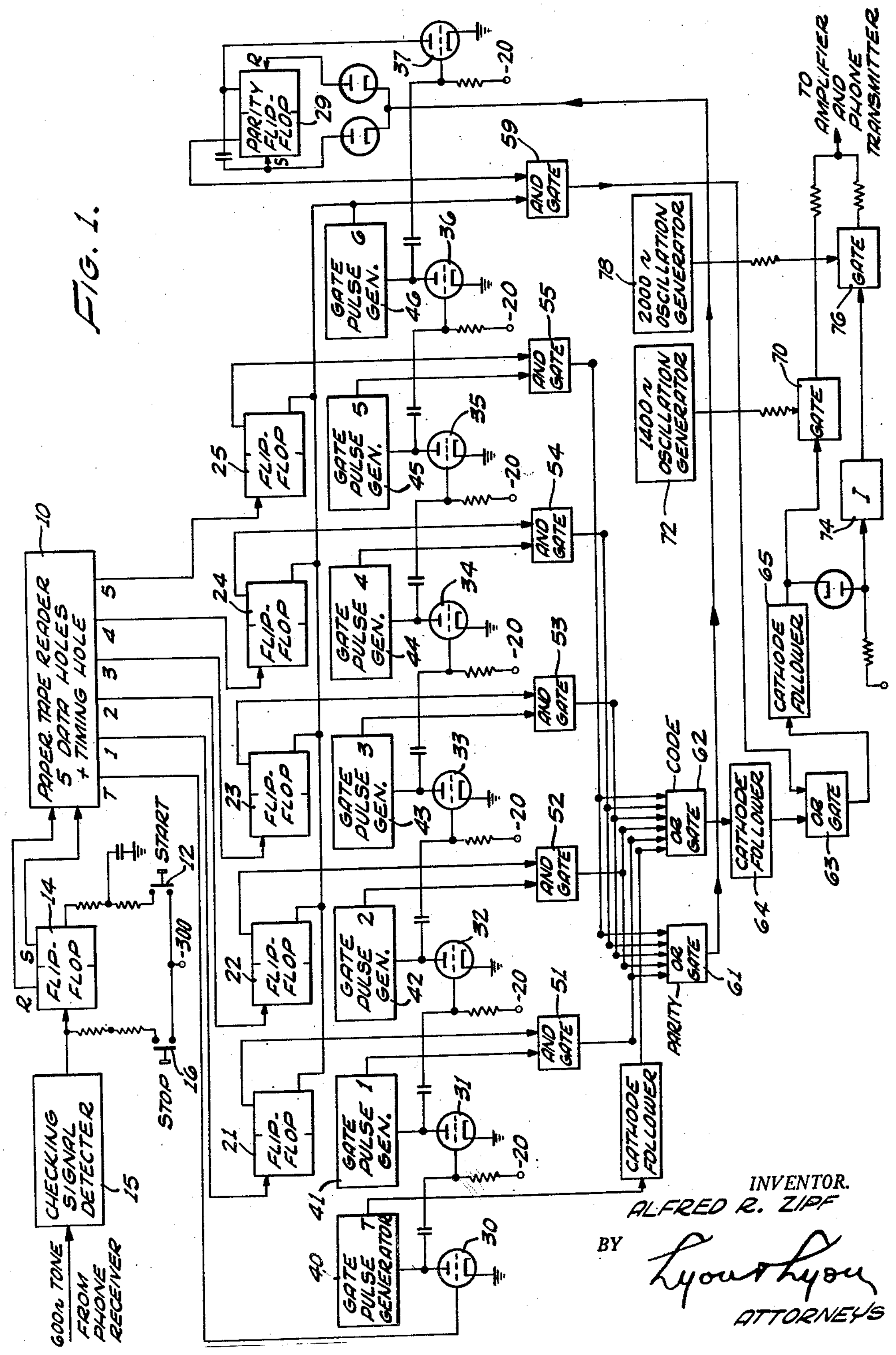
Figure 1 is a block diagram of a code transmitter which is employed in the embodiment of this invention.

Reference is now made to Figure 1, which shows a block diagram of the transmitter employed in the embodiment of the invention. There is required a paper-tape reader 10, which generates electrical signals corresponding to the presence or absence of holes in th paper tape representative of the five-hole code being employed plus another signal representative of the timing hole. This other signal is known hereafter as the starting signal.

In order to start the transmitter, the start button 12 is pressed, which thus sets a flip-flop circuit 14. The start button, however, cannot set the flip-flop if a monitoring signal, which here consists of a 600-cycle tone, is not being received from the telephone receiver by the monitor signal detector 15. Thus, before the transmitter can send data, it is required that the receiver be energized and indicate that it is ready to receive by sending a 600-cycle monitoring tone through the telephone lines. This signal is detected by a suitable transducer, as noted above, consisting of an ordinary microphone which is coupled to the usual telephone receiver. The output of the microphone is applied to the monitor-signal detector. This detector will be described in more detail in Figure 8 and merely comprises a tuned circuit for detecting the 600-cycle tone. The absence of this 600-cycle tone enables the monitor-signal detector to provide an output signal which prevents the flip-flop 14 from being set, or, if it is in its set condition, it resets this flip-flop so that further transmission is cut off. A stop button 16 is also provided so that if it is desired at any time to stop the transmission of signals, this may be accomplished by depressing the stop button, whereby the flip-flop 14 is reset again.

The output of the paper tape reader, which is equivalent to the presence or absence of holes in the data portion of the paper tape, is applied to five associated flip-flop circuits, respectively designated as 21 through 25. The presence of a hole causes the flip-flop to be set; the absence of a hole does not affect the flip-flop which is normally in its reset condition. Thus, it may be seen that the flip-flops 21 through 25 are set or reset in a manner representative of the five-hole code which has just been read on the paper tape.

The timing hole provides a signal which is effectively passed down an electronic distributor, generating a sequence of equally spaced pulses. The electronic distributor includes eight tubes, respectively numbered 30 through 37, which are coupled sequentially to one another via coupling condensers and resistors. The outputs of seven of these tubes 30 through 36 are applied to associated gate-pulse generators 40 through 46. In response thereto these gate-pulse generators each provides an output pulse.

Five of the gate-pulse generators 41 through 45 may be said to be associated with the code portion of the signals to be transmitted. Gate-pulse generators 41 through 45 apply their outputs to And gates 51 through 55. As a second required input to these And gates, there is applied the output from flip-flops 21 through 25. Therefore, if the paper tape reader 10 has detected a hole whereby the flip-flop associated with that hole is set, at a proper time in the sequence generated by the electronic distributor in response to the timing pulse, an output will be derived from the associated one of the And gates 51 through 55. Thus, the code character pulses are sequenced. Of course, if a flip-flop is not set, denoting the absence of the hole, no output is derived from the associated And gate at its turn in the sequence. The outputs from all the And gates 51 through 55 are applied to two Or gates 61, 62. Or gate 61 may be called the parity Or gate and Or gate 62 may be called the code Or gate.

At this time, it should be pointed out that by the term And gate is meant a buffer gate or coincidence circuit. This is the type of circuit which requires the simultaneous presence of all its inputs before an output may be obtained. A suitable circuit for an And gate is subsequently shown herein in Figure 5. By the terminology Or gate is meant a buffer circuit or the type of circuit which has a plurality of inputs and will provide an output whenever any one of the inputs is present. A suitable circuit for the Or gate is shown in Figure 6 subsequently herein also.

The output of the parity Or gate is applied to set or reset a parity flip-flop 29. The parity flip-flop serves to provide a parity One or Zero digit as required. Parity means equality, and by the use of parity as a code check is meant that the number of binary Ones in the code characters will always equal an odd number if an odd parity is desired or an even number if an even parity is desired. Thus, for the five-binary-digit code employed here, a special parity digit position is employed, wherein a One or a Zero may be placed, in order to make the sum of the binary numbers in the entire six positions come to the odd or even figure which is predetermined.

In the present application, an even parity check is desired. Thus, if there are an odd number of Ones in the five positions of the code, then a One will be provided in the sixth, or parity, position. To determine whether or not the parity One is necessary, the output of the Or gate 61 is applied to the parity flip-flop 29. Since the Or gate output consists of a succession of the pulses corresponding to the number of Ones or holes present in the code of the character being transmitted, the flip-flop 29 will be restored to its initial or reset condition if the number of Ones are even and will not be restored to its initial or reset condition if the number of Ones are odd.

If the number of Ones are odd, then this is sensed by an And gate 59, which has as its second required input the output from the last gate-pulse generator 46. The output of And gate 59 is applied to a succeeding Or gate 63. Flip-flop 29 is reset to its initial or starting position by the output of the tube 37, which, as previously described, is at the end of the electronic distributor, and thus provides the setting pulse at a time subsequent to the sampling of the condition of the flip-flop 29. The same pulse which is applied to And gate 59 is also applied to reset the flip-flops 21 through 25.

Figure 7:
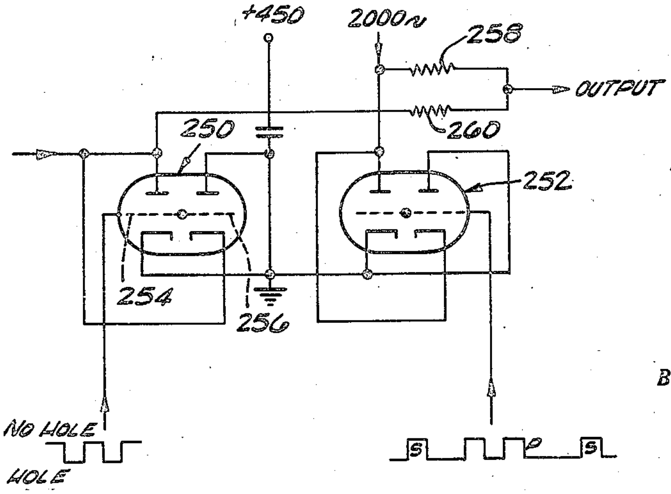
Figure 7 is a circuit diagram of a gate employed in the embodiment of the invention which is suitable for transmitting or preventing transmission of tone signals.

The timing pulse output of the gate-pulse generator 40, as well as the successive outputs of the And gates 51 through 55, are all applied to an Or gate 62. Thus, the output of Or gate 62 in sequence is first, the timing pulse and then the presence or absence of five pulses representative of the code being transmitted. This output is applied through a cathode follower 64 to the Or gate 63. The output of Or gate 63 will be the pulses just recited followed by a parity pulse, if required. The output of Or gate 63 is applied through a cathode follower 65 to a gate 70, which has applied thereto 1400 cycles of oscillation from a 1400-cycle oscillation generator 72. The output of cathode follower 65 is also applied through an inverter 74 to a gate 76, which is also being supplied with 2000 cycles from a 2000-cycle oscillation generator 78. The gates may be termed "normally open" and are closed by the application of a proper signal. The output of the gates 70, 76 is applied to a loudspeaker (not shown) to the transmitter of a telephone. The circuit details of these gates 70 and 76 are shown in Figure 7 and described subsequently. Because of the use of the inverter 74, the signals applied to the respective gates will be in opposite phase, and thus when a pulse occurs representative of a binary One, gate 74 is closed and a 2000-cycle tone is transmitted, and when a pulse occurs representative of a binary Zero gate 76 is closed and a 1400-cycle tone is transmitted. The timing pulse and the parity One pulse both will be transmitted in the same fashion as a binary One. The circuit components of the gate-pulse generator for forming the timing pulse are made such that this pulse is shorter than any of the other pulses being transmitted. The receiver can thus distinguish between the short timing pulse and the longer code-character pulses.

In summary therefore, the reading means at the receiver is enabled by a monitor tone signal to generate a timing-pulse signal and binary-digit pulse signals representative of the data character read. These are sequenced and a parity digit is also generated. A pair of gates, to which a pair of tone signals are continuously applied, are closed selectively in response to the successive pulse signals. Thereby, tone bursts representative of a start pulse, a five-binary-digit character, and a parity digit are transmitted over the telephone lines.

Figure 2:
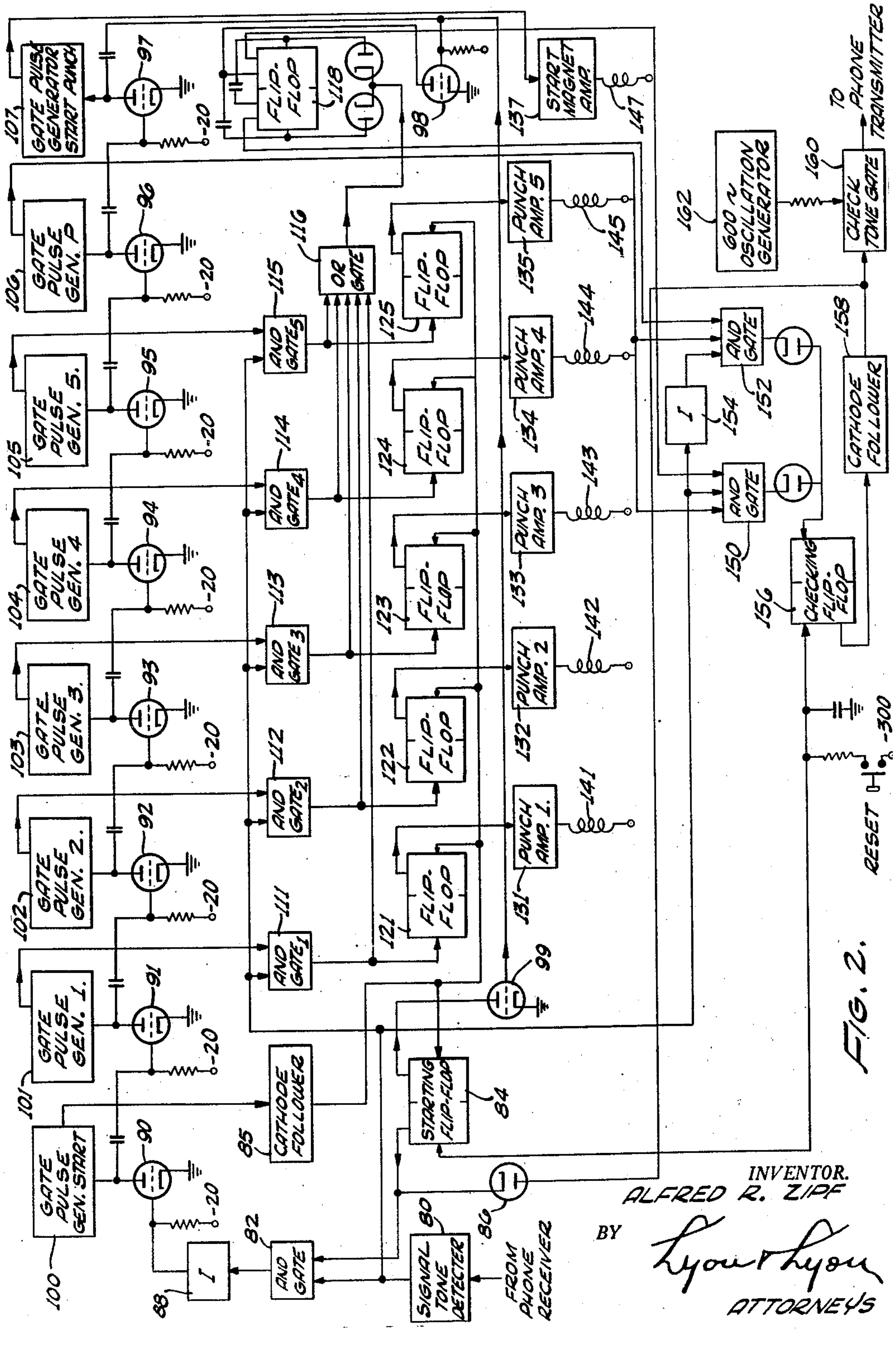
Figure 2 is a block diagram of the receiver which is employed in the embodiment of this invention.

Figure 2 is a block diagram of a receiver which is employed in the embodiment of the invention. The succession of tone bursts are converted into electrical signals by a microphone adjacent the telephone receiver. The microphone (phone receiver) output is applied to a signal tone detector 80 which provides, as its output, positive and negative pulses indicative of the presence of Ones and Zeros in the received signals. These are applied to an And gate 82. The other required input to the And gate 82 is output from the set side of the starting flip-flop 84. Flip-flop 84, when the receiver is to operate, is in the condition with its output to And gate 82 high. When it is necessary to block or hold off further signals being applied to the receiver, then flip-flop 84 is triggered to its other stable condition, at which time it prevents further signals from being applied to And gate 82, and also serves to cut off further transmission of a 600-cycle monitoring signal by applying a hold-off pulse via a diode 86 to a check-tone gate 160 to block the further transmission of the monitor tone.

The first signal to be received by the signal-tone detector and the only signal which passes through the And gate 82 is the timing-pulse signal. This timing pulse is inverted by an inverter 88 and is applied to an electronic distributor of the same type as was described for the transmitter. This comprises nine tubes 90 through 98, which are coupled successively in series via a condenser and resistor. The output of each of the tubes 90 through 97 is respectively applied to an associated gate-pulse generator 100 through 107. Gate-pulse generator 100 applies an output through a cathode follower 85 to reset starting flip-flop 84, as well as flip-flops 121 through 125 which are described later. It should be noted that flip-flop 84, when reset, no longer enables And gate 82 and blocks further monitor tone transmission. Thereby the transmitter will not transmit further signal tones until the receiver again transmits the monitoring tone.

Gate-pulse generators 101 through 105, which correspond to the five binary digital positions of the code, apply their outputs respectively and successively to And gates 111 through 115, which are associated therewith. The other required inputs to these And gates are the successive pulses which have been derived from the successively received tone signals by the signal-tone detector 80. The timing of the outputs of the gate-pulse generators is arranged to coincide with the occurrence of the tone signals, thus insuring that aside from an unusual coincidence of occurrence only these will pass through the And gates. Thus, a coincidence in inputs applied to the respective And gates 111 through 115 will enable the output of the successive And gates to set or not the associated flip-flop circuits 121 through 125. These serve to store and staticize the received code character. Each one of these flip-flop circuits has its set output connected to a succeeding punch amplifier 131 through 135. These punch amplifiers operate the punch magnets 141 through 145, if energized. The punch magnets are incorporated in tape-perforating apparatus of the type which is commercially purchasable and which is employed for perforating tape with the code which has been received from the transmitter.

The output of each one of the And gates 111 through 115 is also applied to an Or gate 116. This Or gate applies its output to a parity-pulse-counter flip-flop 118. This flip-flop is driven from its set to its reset condition and returns in response to the successive outputs received from Or gate 116. The condition of flip-flop 118 is sampled by two And gates 150, 152, which are connected to the two sides of the flip-flop. As a second required input to both And gates, there is presented the same input as is applied to the And gates 111 through 115, namely, the pulses which are the output of the signal-tone detector. It should be noted, however, that the pulses are applied directly as received from the signal-tone detector to And gate 150 but through an inverter 154 to And gate 152.

As a third required input there is applied to And gates 150 and 152 the output pulse from the gate-pulse generator 106 which occurs at the time the parity pulse should occur. Thus, either And gate 150 or And gate 152 will be enabled, dependent upon the condition in which the flip-flop counter 118 was left responsive to digit pulses and the presence of a parity One or Zero at the time such parity pulse should occur. This last timing input, of course, is received from the gate-pulse generator 106. If the number of Ones counted by flip-flop 118 is an odd number, then And gate 152 will be enabled unless a parity-pulse occurs at its proper time. If a parity pulse does not occur at its proper time, then the flip-flop 156 is set by output from And gate 152. The set output of the flip-flop 156 is applied to a cathode follower 158. The cathode follower then closes a normally open gate 160 to prevent further 600-cycle oscillations from being applied to the telephone transmitter. Flip-flop 84 is also reset by the output of flip-flop 156. Thus also And gate 82 does not receive any further start signals. Gate 160 is further maintained set by the operation of diode 86, which is connected to the output of flip-flop 84.

In the event that an even number of Ones is counted by flip-flop 118 and an unnecessary parity One is received, then And gate 150 is opened and its output provides the same operations as the output of And gate 152, to prevent further monitor-tone transmission.

In the event of a correct parity check, neither And gate 150 nor And gate 152 will be opened. With the unique checking circuit formed by flip-flop 118 and And gates 150 and 152, it can be determined whether or not the coded data which has been received is correct.

An output from the tube 97 in the electronic distributor is applied to tube 98, which is connected to reset flip-flop 118 to its initial, or starting count condition. This same output is also applied to a tube 99, which is coupled to the start flip-flop 84 to set it again to enable another start-signal pulse to pass through And gate 82. Thus, also, the hold-off bias applied to close the monitor-tone gate through diode 86 is removed, unless, of course, as recited above, flip-flop 156 has been actuated, in which event a manual reset is required.

The output of the gate-pulse generator 107 is applied to an amplifier 137, which is designated as the start-magnet amplifier and is connected to the start-magnet solenoid 147. This enables the simultaneous punching of the encoded data which has been stored into the paper tape. The flip-flops 121 through 125 are reset before the actual arrival of the next code character by output from the gate-pulse generator 100 when the next timing pulse which is received, which, as previously recited, also resets the start flip-flop as well.

Thus, in summary, the receiver converts the sequence of tones received over the telephone to a sequence of pulses. The start pulse cuts off further transmission of the monitor tone to the receiver. The character pulses are stored in the punch set magnets and the correctness of the received transmission is checked by checking parity. If incorrect, the monitor tone is still held off. If correct, then the receiver monitor tone is turned on transmission again, signifying its request to the transmitter for the next character and punching the stored character onto paper tape.

Figure 3:
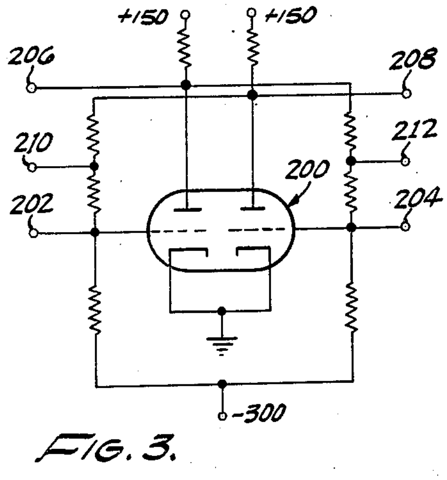
Figure 3 is a circuit diagram of a flip-flop circuit suitable for use in the embodiment of the invention.

Reference is now made to Figure 3 of the drawings. This figure is a circuit diagram of a flip-flop circuit which is suitable for employment in the receiver and transmitter circuits which are shown in Figures 1 and 2. The flip-flop may comprise a suitable double-triode tube 200 having cross-coupling between its grids and anodes. The flip-flop circuit shown is stable with either triode section conducting and may be driven from conduction in one to conduction in the other by the application of negative pulses to the input-grid terminals 202 or 204. Connections to the flip-flop circuit for obtaining the so-called plate-follower action may be made to terminals 206 and 208. A plate-follower is merely another tube which has its plate connected to the plate of one of the triode sections of the flip-flop. Thus, when a positive signal is applied to the control grid of the plate-follower tube, it draws current through the common plate load. The plate load is common in view of the fact that both the triode section of one flip-flop circuit and the plate-follower tube will draw their plate current through the same load resistor. Thus, in effect, the result is the same as if a positive signal were applied to the grid of the triode section to which the plate follower is coupled.

The current being drawn through the plate load serves to depress the plate potential and apply a negative signal to the other triode section, whereby it is prevented from further conduction. This, in effect, applies a positive signal to the grid of the triode section to which the plate follower is coupled to further assist its becoming conductive. Output from the flip-flop may be taken either from the terminals 206, 208, which are directly connected to the plates, or from terminals 210, 212. The flip-flop circuit which is shown herein is a typical one, and its operation is that of the classic Wynn Williams or Eccles-Jordan circuits.

Figure 4:
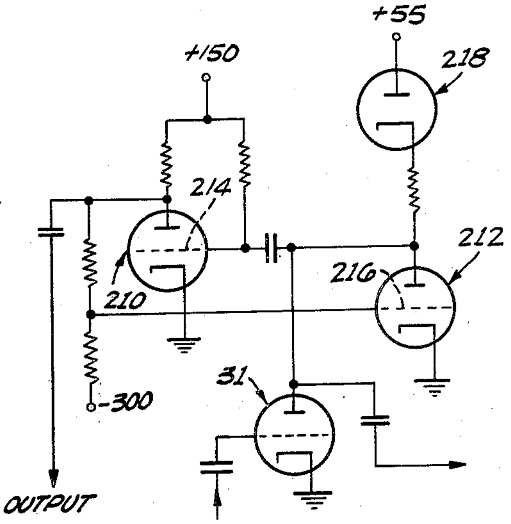
Figure 4 is a circuit diagram of a pulse generator circuit suitable for use in the embodiment of the invention.

Reference is now made to Figure 4, which shows a circuit diagram of a suitable gate-pulse generator. In effect, this comprises the well-known univibrator, or one-shot multivibrator, wherein one of the two tubes 210, 212, of which the univibrator is composed, is maintained conducting in the standby condition by virtue of the bias applied to its grid 214. A less positive bias is applied to the grid 216 of the second tube. The tube 31 is representative of the tubes 30 through 36, which are employed in the transmitter, or the tubes 90 through 97, which are employed in the receiver. Upon receiving a positive pulse, the tube 31 is enabled to conduct. Thereupon, it draws current through the diode 218, which is connected to a source of positive potential. In doing this, the anode of tube 212 is rendered more negative and a negative potential is applied to the grid 214 of tube 210. Thus, tube 210 is made to become nonconductive, whereupon a positive voltage output is applied to the grid 216 of tube 212. In the meantime, the anode of tube 31 is raised to a voltage level determined by the B+ voltage and the value of the anode load resistor of the tube 212. This is a positive voltage with respect to ground and is applied to the succeeding tube in the electronic distributor. A negative pulse is derived from the plate of tube 210. The time during which the univibrator remains in the second unstable condition is determined by the values of the condenser which couples the plate of tube 212 to the grid 214 of tube 210 and the resistor coupling this latter grid to the B+. When the voltage charge on the condenser has dissipated, the univibrator will return to its initial standby condition. The output of the pulse generator is employed for resetting the flip-flops or for enabling the succeeding And gate depending upon whether the pluse generator is employed in the receiver or in the transmitter.

In the case of the gate-pulse generator 100 in Figure 2, its output is applied to a cathode follower 85, which is normally kept conducting. Upon the application of the negative output of the gate-pulse generator, the cathode follower applies a negative pulse to the start flip-flop 84, which is thus turned to the condition whereby it blocks the application of further pulses to the And gate 82 and through diode 86 turns off the monitor-tone gate, preventing the further transmission of monitor tones to the transmitter. The start flip-flop remains turned off until the pulse which is applied to the first gate-pulse generator has propagated down to the start-punch gate-pulse generator 107. At this time, as was described previously, the output of the tube 97 through tube 99 is applied to flip-flop 84 to reset it again, whereby And gate 82 is again enabled and the monitor-tone gate is opened again to the transmission of monitor tones. This type of operation insures that the receiver is only working on one character at a time consisting of the binary digits derived from the holes punched across only one section of the tape. The succeeding character is not transmitted until the check tone is again received. In this manner also the only pulse which is propagated down the electronic distributor is the start pulse; the others are prevented by the closed And gate 82.

Figure 5:
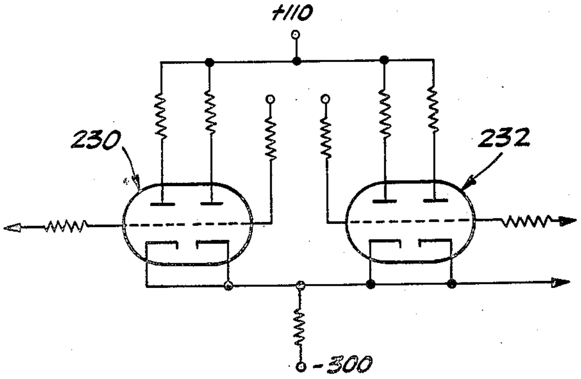
Figure 5 is a circuit diagram of an And gate suitable for use in the embodiment of the invention.
Figure 6:
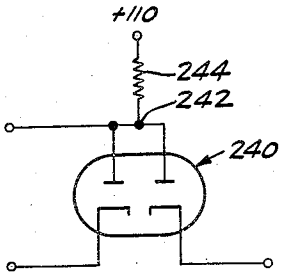
Figure 6 is a circuit diagram of an Or gate suitable for use in the embodiment of the invention.

Figure 5 is an illustration of an And gate which is suitable for employment in the receiver and transmitter. As shown, it comprises two pairs of dual triodes 230, 232, which have their cathodes connected together and through a common-cathode resistor to a negative-bias source. In the normal, or standby, condition the tubes are conducting current and the cathodes are positive. A negative voltage must be applied to all the grids, whereby the tubes are all cut off and the cathode will then drop to a negative value of 300 volts, or whatever the value of the negative-biasing potential applied to the common-cathode load resistor is. The application of a negative pulse to less than all of the grids does not cut all of the tubes off and, therefore, unless there is the simultaneous presence of negative voltages applied to the grids, there is substantially no negative output derived from the common-cathode connection. Figure 5 shows the circuit for a four-input And gate. Three inputs may be employed by applying a fixed negative bias to one of the four input grids. A two-input And gate may be employed by eliminating one of the double triodes.

Figure 6 is a circuit diagram of an Or gate which is suitable for employment in the embodiment of the invention. This employs a double diode 240, which has a common anode connection 242, to which is applied through a resistor 244 a positive bias. A negative voltage applied to either cathode of the double diode will cause an increase in the current which flows through one or the other portions of the double diode. However, in view of the common-anode connection, the voltage at this connection will drop by a proportional amount. Thus, in response to a negative input to either of the cathodes, a negative output will be derived at the connection.

Figure 7 is a circuit diagram of the gates 70 and 76 which are employed in the transmitter. One of these gates is also employed as the tone gate 160 in the receiver. Each gate consists of a double triode 250, 252. A description of one of these will suffice for both. The grids 254, 256 of the double triode are connected together. The input to the grids of tube 250 is the output of the cathode follower 65; the input to the grids of the double triode 252 is the output from the inverter 74. The cathode of one of the triodes and the plate of the other of the triodes is connected to a common point and to the oscillator. The anode of the remaining triode and the cathode of the remaining triode are each connected to ground. When a positive signal is applied to the common grids, the tube is made to conduct and thus presents a short circuit between the oscillator and ground. A negative signal on the grids blocks tube conduction. Therefore, the output which is taken from the common-cathode plate connection is effectively shorted to ground whenever a positive pulse is applied to the grids. The outputs of both gates are connected together by means of two isolation resistors 258, 260. The common-output connection is then applied through an amplifier to an electromechanical transducer, such as a loudspeaker, which is coupled to the transmitter of the telephone. The starting pulse, as shown by the wave shapes in Figure 7, is negative for 1400 cycles and positive for 2000 cycles. Accordingly, the starting pulse will be a 1400-cycle pulse. This occurs because the positive pulse is applied to the 2000-cycle gate and effectively prevents any output from being obtained therefrom, when the negative pulse is applied to the 1400-cycle gate and enables the output to be derived therefrom.

Figure 8:
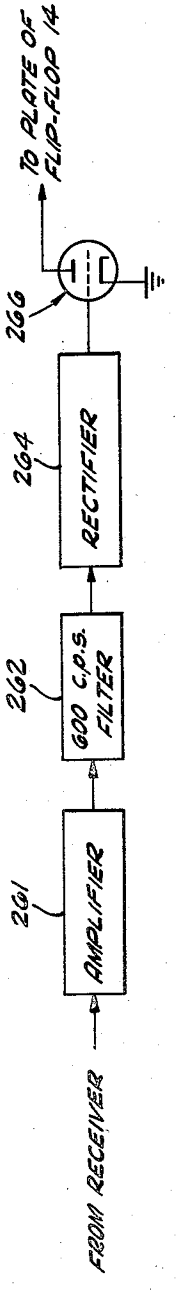
Figure 8 is a block diagram of a detector for the monitor tone received at the transmitter employed in the embodiment of the invention.

Figure 8 shows further details of the checking-signal detector 14 which is in the transmitter. As shown, this comprises an amplifier 261, which amplifies the received 600 cycles and applies it to a 600-cycle filter 262. The output of the filter is rectified by a rectifier 264 and applied to a plate-follower tube 266, which, in the manner previously described, is coupled to one of the plates of the flip-flop tube 14. The rectifier 264 serves the function of applying a negative bias derived from the received 600-cycle signal to the plate-follower tube to maintain it at cut-off. Should any interruption occur to the 600-cycle check tone, the plate-follower tube is then enabled to conduct and resets the flip-flop 14, which prevents the paper-tape reader from advancing the paper tape past the position at which the 600-cycle tone was interrupted.

Figure 9:
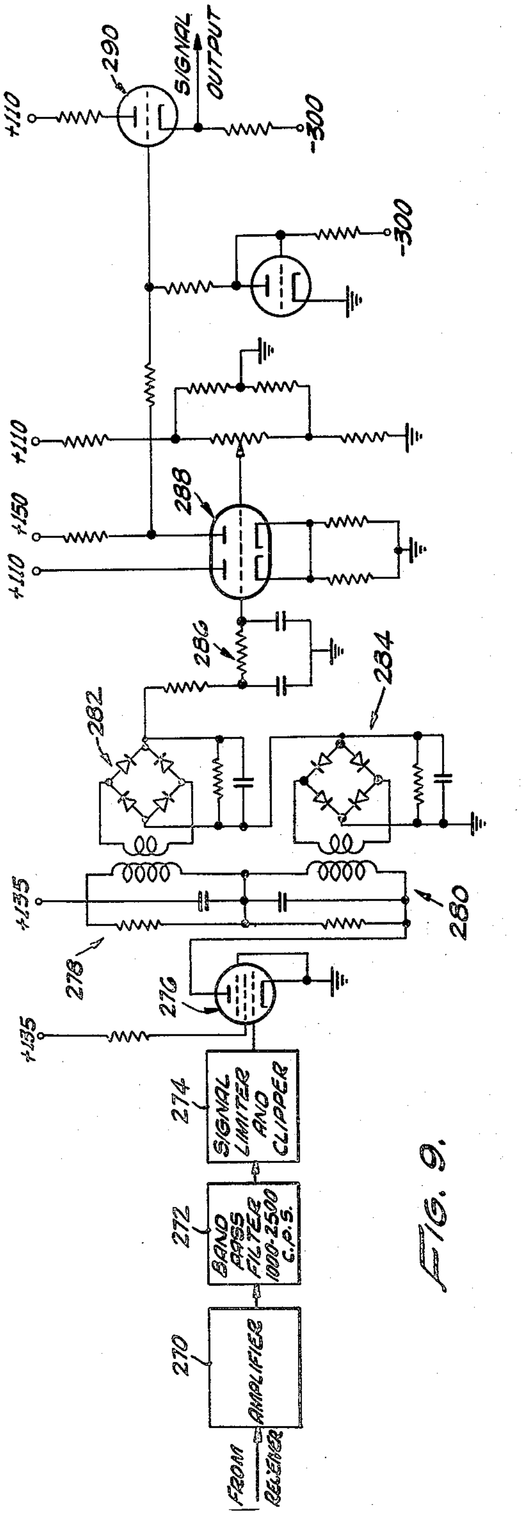
Figure 9 is a schematic and block diagram of a circuit for detecting tone signals at the receiver and converting them to representative pulses.

Reference is now made to Figure 9, which shows further details of the signal-tone detector 80 in Figure 2. The output from the receiver of the telephone is applied to a transducer, such as a microphone, which converts the receiver signals into electrical signals. These are applied to an amplifier 270 and then to a band-pass filter 272. The band-pass filter has a bandwidth corresponding to between 1000 and 2500 cycles per second. The output of the band-pass filter is applied through signal-limiting-and-clipping circuitry 274 which is well known in the art. This serves the function of properly shaping the received signal and limiting its amplitude. The output of the signal-limiter-and-clipper is applied to signal-discriminator circuitry which is shown in detail. This comprises a tube 276, which has as its plate load two tuned circuits. One of these 278 is tuned to a center frequency of 2150 cycles; the other of these 280 is tuned to a center frequency of 1300 cycles. These two tuned circuits are in series. Their outputs are respectively inductively coupled to two bridge networks 282, 284. The two bridge networks are also in series.

The outputs from the two bridge networks are applied to a filter 286, which may be considered as a low-pass filter. The output from the filter will be a signal which is positive in the presence of 2000 cycles and is negative in the presence of 1400 cycles. For the values shown, the signal will be roughly positive by about 20 volts and negative by about 20 volts. The filter output is applied to a difference amplifier 288, which is employed to establish a threshold level. That is, a minimum signal must be present, which must exceed this threshold before any output is derived from the second tube of the differential amplifier 288. This output signal is then applied through suitable coupling network to an output cathode follower 290. The output of this cathode follower will be a square wave which ranges from +10 volts in the presence of 2000 cycles at the input to the system to approximately −25 volts which is the signal obtained when the input to the system is 1400 cycles. The output from this cathode follower 290 is applied to the And gate 82. Since And gate 82 is of the type which provides an output only when there is a negative signal applied to both of its inputs and since the starting signal is a 1400-cycle signal, the output from the cathode follower will be substantially −25 volts in the presence of the starting signal, and thus is enabled to pass through the And gate 82.

The inverters which are shown throughout the block diagrams merely comprise one stage of amplification which, operating in the normal course, inverts the signal which is applied as input thereto.

In an embodiment of the invention which was built and operated, the sole limit to the speed of transmission was that of the mechanical punching apparatus. Speeds of transmission of 25 to 30 characters per second were obtained as opposed to presently used equipment which transmits only seven characters per second.

Accordingly, there has been shown and described above a novel, useful, and unique system and apparatus for increasing the utility of the normal communication means, namely, the telephone, by transmitting data in the form of code between two telephone stations. No alteration is required to the telephone system at all. The tones are applied to the telephone transmitter by a small loudspeaker, and the signals are derived from the telephone receiver by means of a small microphone. Coupling between the telephone instrument and the loudspeaker and pickup microphone of the invention is performed by applying the two together. Sufficient safeguards are applied so that chances of error in the receipt of data being transmitted or interfering signals being picked up on the lines being employed for the transmission are substantially eliminated by using the check-tone and parity features and by the receiver shutting off the transmitter until it has had a chance to assimilate the character just received. It is to be understood that the values indicated for the check-tone and digit-representative frequencies are by way of illustration only and are not to be construed as a limitation upon the invention.

I claim:

1. Apparatus for communicating coded data between separate stations of a telephone network, each station having a telephone receiver and transmitter, said data having been recorded as a series of characters, each character consisting of a plurality of binary digits, said apparatus comprising a code transmitter at one of said separate stations including means responsive to said recording to generate successive tone signals representative of a start signal, the binary digits in a character and a parity digit, and means to apply said successive tone signals to the telephone transmitter; a code receiver at a receiving one of said separate stations including means coupled to the telephone receiver to detect said tone signals, means to convert said detected tone signals to pulse signals representative of said start signal, said signals representative of said binary digits in a character and said parity digit, means to generate a monitoring tone signal, means to apply said monitoring tone signal to the telephone transmitter, means responsive to said start signal to prevent application of said tone signal to said telephone transmitter, a plurality of gates, means to apply said pulse signals to all said gates, means to successively open said gates responsive to said start pulse, means to record the output from said gates, means to inactivate said means to prevent application of said tone signal to said telephone transmitter subsequent to the last of said gates being opened, means to check the parity of said pulse signals, means responsive to an incorrect parity to prevent application of said monitoring tone signal to said telephone transmitter, and means at said code transmitter to operate said means to generate tone signals responsive only when receiving a monitoring tone signal.

2. Apparatus for communicating coded data between separate stations of a telephone network, each station having a telephone receiver and transmitter, said data having been recorded as a series of characters, each character consisting of a plurality of binary digits, said apparatus comprising a code receiver at a receiving one of said separate stations including means to generate a monitoring tone signal, means to apply said monitoring tone signal to the telephone transmitter of said receiving station, means to check the parity of any received code signals, and means to interrupt transmission of said tone signal responsive to an error in parity checking, a code transmitter at a transmitting one of said separate stations including means to detect said monitoring tone signal, reading means for said recorded data responsive to said received monitoring tone signal to produce a start signal and signals representative of each binary digit in a character, a parity signal generator, means responsive to said start signal to sequence a repetition of said start signal, said signals representative of each binary digit in a character and output from said parity generator, means to generate a first tone representative of a binary One and a second tone representative of a binary Zero, and means for applying said first or said second tone to the telephone transmitter responsive to said sequenced repetition signals.

3. Apparatus for communicating data coded and recorded as a series of characters, each character consisting of a plurality of binary digits, said data being communicated between separate stations of a telephone network, each station having a telephone receiver and transmitter, said apparatus comprising a code transmitter at one of said separate stations including reading means responsive to said recorded data to generate pulse signals representative of a start signal and the binary digits in a character, monitor-tone responsive means coupled to said telephone receiver to control said reading means, means to generate a parity-digit signal responsive to said binary-digit signals, means to generate a first tone signal representative of one binary digit and a second tone signal representative of the second binary digit, and means to successively apply one or the other of said first and second tone signals to the telephone transmitter responsive to said pulse signals and said parity-digit signal; a code receiver at another of said separate stations, said code receiver having means to generate a monitor-tone signal, means to apply said monitor-tone signal to said telephone transmitter, means to detect the tone signals at said telephone receiver, means to convert said detected tone signals to pulse signals, means responsive to the start-signal pulse to inactivate said monitor-tone applying means, means responsive to said start-signal pulse to store the character represented by said pulse signals, means to activate said monitor-tone applying means after said pulse signals are stored, means to check the parity of said pulse signals, and means responsive to an incorrect parity to inactivate said monitor-tone applying means.

4. Apparatus for communicating coded data between separate stations of a telephone network, each station having a telephone receiver and transmitter, said data being recorded as a series of characters, each character consisting of a plurality of parallel binary digits, said apparatus comprising a code transmitter at one of said separate stations including reading means to produce a start signal and signals representative of each binary digit in the recorded character, monitor-tone responsive means coupled to the telephone receiver to control said reading means, a parity-signal generator, means responsive to said start signal to sequence a repetition of said start signal, said signals representative of each binary digit in a character and output from said parity generator, means to generate a first tone representative of a binary One and a second tone representative of a binary Zero, means for applying said first or second tone to the telephone transmitter responsive to said sequenced repetition signals, a code receiver at a receiving one of said separate stations including means coupled to the telephone receiver to detect said tone signals, means to convert said detected tone signals to pulse signals representative of said start signal, signals representative of the binary digits in a character and said parity generator output, means to generate a monitoring tone signal, means to apply said monitoring tone signal to the telephone transmitter, means responsive to said start-signal-pulse signal to prevent application of said tone signal to said telephone transmitter, a plurality of gates, means to apply said pulse signals to all said gates, means to successively open said gates responsive to said start pulse, means to store the output from said gates, means to inactivate said means to prevent application of said tone signal to said telephone transmitter subsequent to the last of said gates being opened, means to check the parity of said pulse signals, and means responsive to detection of an incorrect parity to energize said means to prevent application of said monitoring tone signals to said telephone transmitter.

5. Apparatus for communicating data coded and recorded as a series of characters each character consisting of a plurality of binary digits, said data being communicated between separate stations of a telephone network, each station having a telephone receiver and transmitter, said apparatus comprising a code transmitter at one of said separate stations including reading means responsive to said recorded data to generate signals representative of a start signal and the binary digits of a character of data, tone-responsive enabling means for said reading means coupled to the telephone receiver, a plurality of flip-flop circuits, each one being associated with a different binary digit in said data character, means for setting said flip-flops responsive to the binary digits in the data character read to represent said data character, a different And gate associated with and receiving output from each flip-flop, means for successively enabling said And gates responsive to said start pulse, means for counting the outputs from said successively enabled And gates to generate a parity digit where required therefor, a first and second tone generator respectively representative of a binary One and a binary Zero, a first and second gate means to which said first and second tone-generator outputs are respectivey applied, means to apply said start pulse, said And gate outputs and said parity digit to said gate means to enable one or the other of said gate means, and means for applying the outputs from said gate means to the telephone transmitter; and a code receiver for said data at another of said separate stations including means to generate a monitor-tone signal, means to apply said monitor-tone signal to the telephone transmitter for each character of data desired, and means coupled to the telephone receiver to detect and record the data received from the transmitter.

6. Apparatus for communicating coded data between separate stations of a telephone network, each station having a telephone receiver and transmitter, said data being recorded as a series of characters, each character consisting of a plurality of binary digits, said apparatus comprising a code transmitter at one of said separate stations including means responsive to said recording to generate successive tone signals representative of a start signal, the binary digits in a character and a parity digit, and means to apply said successive tone signals to the telephone transmitter; a code receiver at a receiving one of said separate stations including means coupled to the telephone receiver to detect said tone signals, means to convert said detected tone signals to pulse signals representative of said start signal, said signals representative of said binary digits in a character and said parity digit, means to generate a monitoring tone signal, normally open gate means to which said monitoring tone signal is applied, means to apply the output of said normally open gate means to the telephone transmitter, means responsive to said start-signal pulse to close said normally open gate means, an And gate for each binary digit in a character, means to apply said pulse signals to all said And gates, means responsive to said start-signal pulse to successively enable said And gates, means responsive to said parity-digit-pulse signal and the outputs of said And gates to check the parity of the received data character, means responsive to an incorrect parity to maintain closed said normally open gate means, means to store the outputs of said And gates, and means to open said normally open gate means after parity has been checked.

No references cited.